United States Patent [19]

Fisher et al.

[11] Patent Number: 5,580,101
[45] Date of Patent: Dec. 3, 1996

[54] TAPERED JOINT THREAD SYSTEM

[75] Inventors: Albert D. Fisher, LaHarpe; William E. Fritsche, Iola, both of Kans.

[73] Assignee: Midland Brake, Incorporated, Kansas City, Mo.

[21] Appl. No.: 531,892

[22] Filed: Sep. 22, 1995

Related U.S. Application Data

[63] Continuation of Ser. No. 106,123, Aug. 12, 1993, abandoned.

[51] Int. Cl.⁶ .................................................. F16L 35/00
[52] U.S. Cl. ........................ 285/40; 285/94; 285/174; 285/333
[58] Field of Search ........................... 285/40, 333, 251, 285/174, 334, 355, 390, 94

[56] References Cited

U.S. PATENT DOCUMENTS

| | | | |
|---|---|---|---|
| 2,580,818 | 1/1952 | Mundy et al. | 285/40 |
| 2,825,585 | 3/1958 | Griffin | 285/333 X |
| 3,224,799 | 12/1965 | Blose et al. | 285/334 |
| 3,661,670 | 5/1972 | Pierpont, Jr. | 156/172 |
| 4,054,305 | 10/1977 | Gajajiva et al. | 285/40 X |
| 4,488,738 | 12/1984 | Valdes | 285/40 |
| 4,643,467 | 2/1987 | Wood | 285/334 |
| 4,893,658 | 1/1990 | Kimura et al. | 138/109 |
| 5,015,014 | 5/1991 | Sweeney | 285/81 |
| 5,106,130 | 4/1992 | Ellsworth et al. | 285/355 |
| 5,169,179 | 12/1992 | Teal | 285/40 |

FOREIGN PATENT DOCUMENTS

| | | | |
|---|---|---|---|
| 904042 | 2/1954 | Germany | 285/333 |
| 3250 | 3/1913 | United Kingdom | 285/333 |
| 2101700 | 1/1983 | United Kingdom | 285/333 |

Primary Examiner—Dave W. Arola
Attorney, Agent, or Firm—St. Onge Steward Johnston & Reens

[57] ABSTRACT

The invention presented is a tapered joint thread system, especially for use in a fluid handling device, and a fluid handling device containing the inventive tapered joint thread system. More particularly, the invention presented includes a plastic female end segment having an opening sized to receive a male fitting, and having a first tapered segment which tapers from a first internal diameter to a second internal diameter, and which is gauged from the opening of the female end segment to a controlled depth; the female end segment also has an unthreaded non-tapering segment having the second internal diameter which extends from the controlled depth to a second controlled depth, and an angled shoulder which tapers from the second internal diameter to a third internal diameter and which extends from the second depth to a third controlled depth.

11 Claims, 1 Drawing Sheet

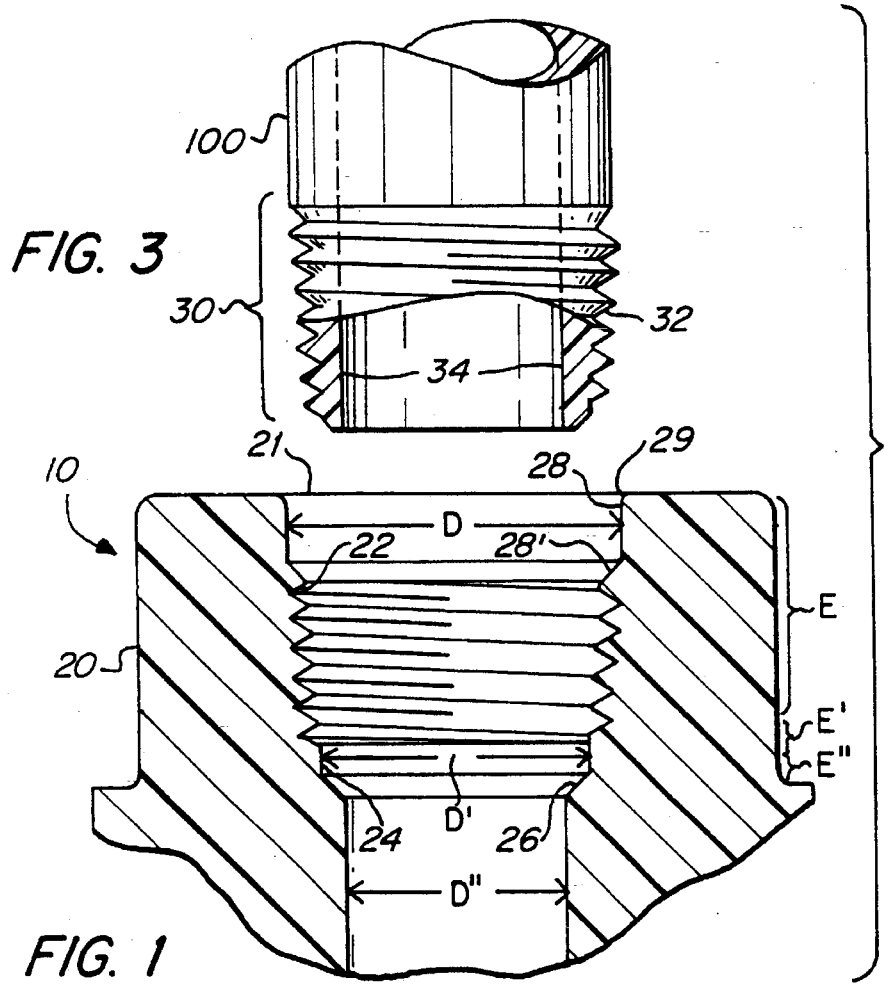
FIG. 3
FIG. 1
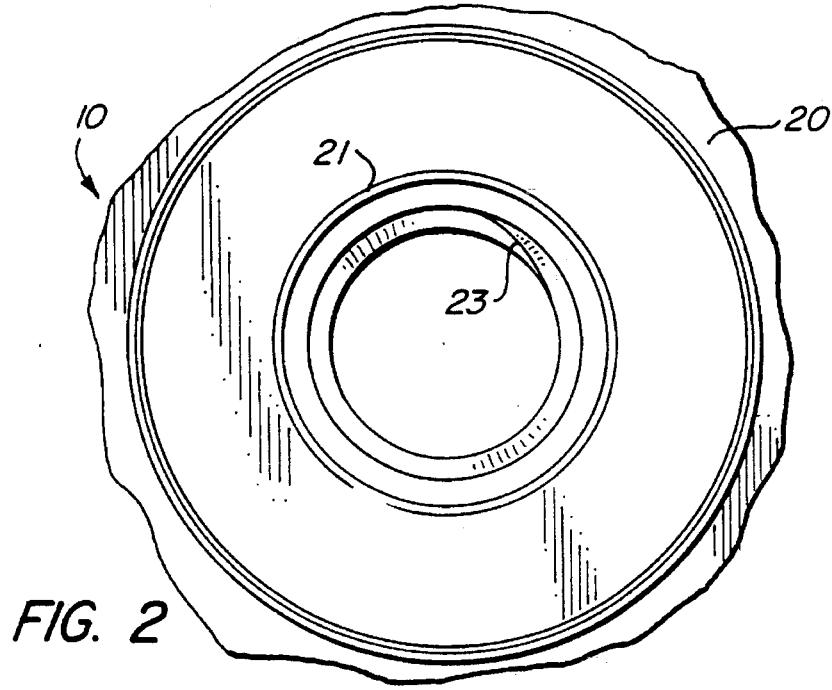
FIG. 2

TAPERED JOINT THREAD SYSTEM

This application is a continuation of application(s) Ser. No. 08/106,123 filed on Aug. 12, 1993, now abandoned.

TECHNICAL FIELD

The present invention relates to a thread system for forming a joint between a standard NPT or NPTF male and a female threaded plastic part, which can be joined in a male/female relationship. More specifically, the joint is formed between a metal pipe fitting (male) and a plastic female fitting. The two fittings can comprise the ends of adjacent pipes, where the end of one pipe forms the male element of the system and the end of the second pipe forms the plastic female element of the system. Alternatively, the two parts can comprise the end of a pipe and a port or fitting in a device such as a device for handling air or other fluids, where the end of the pipe forms the male element of the system and the device fitting forms the female element of the system. The inventive thread system guards against over-tightening and facilitates fitting and sealing of the joint, especially where pre-applied sealants are used.

Dryseal pipe threads are designed to seal pressuretight joints without the necessity of using sealing compounds. To accomplish this, some modification of thread form and greater accuracy in manufacture is required. The roots of both the external and internal threads are truncated slightly more than the crests, i.e. roots have wider flats than crests, so that contact occurs at the crests and roots coincident with or prior to flank contact. Thus as the threads are assembled by wrenching, the roots of the threads crush the sharper crests of the mating threads. This sealing action at both the major and minor diameters tends to prevent spiral leakage and makes the joints pressuretight without the necessity of using sealing compounds, provided that the mating threads are in accordance with standard specifications and tolerances and are not damaged by galling in assembly. The control of crest and root truncation is simplified by the use of properly designed threading tools. Also, it is desirable that both external and internal threads have full thread height. However, where not functionally objectionable, the use of a compatible lubricant or sealant may be used to minimize the possibility of galling.

Elements of air and fluid handling devices which utilize dryseal pipe threads are often made from Engineering Grade Plastic (EGP), which conventionally refers to plastics to which standard metal engineering equations can be applied. Such plastics are capable of sustaining high loads and stresses, and are machinable and dimensionally stable. Engineering Grade Plastics are used in various applications, including in the construction industry, as machine parts, and as automotive components. Typical Engineering Grade Plastics include nylon, acetals, polycarbonates, acrylonitrile-butadiene-styrene (ABS) copolymers or resins, polyphenylene oxide/styrene (PPO/styrene) and polybutylene terephthalate. Other EGP plastics would be familiar to the skilled artisan.

Devices made from Engineering Grade Plastics often require dryseal joints to be formed between adjacent segments of pipe or between a pipe and a port or fitting in the device. In these situations, integrity of the joint is critical for operability of the device and often difficult to achieve because of the tendency to over-tighten a metal male pipe end into a plastic female pipe end or port, especially where pre-applied sealants are used. Such over-tightening can result in a loss of integrity or an at least partial blockage of fluid flow through the system.

What is desired, therefore, is a joint thread system which facilitates the formation of a high integrity joint between complementary male/female fittings, yet avoids over-tightening or fluid blockage even when pre-applied sealants are used. The desired system should enable use of industry standard male fittings joined with plastic female fittings.

BACKGROUND OF THE INVENTION

The formation of seals between fittings has been the subject of much attention because a seal lacking integrity can lead to failure of the device of which it is an element. In one attempt at solving the problems inherent in seals, Wood, in U.S. Pat. No. 4,643,467, provides a threaded tubing seal having a tapered thread with a sealing profile and a shoulder seal, as well as a plastic, self-energized O-ring seal. Blose et al. describes a metal to metal seal, having engageable threads of relatively long pitch disposed on a relatively steep taper in U.S. Pat. No. 3,224,799. In U.S. Pat. No. 5,106,130, Ellsworth and Baer disclose a thread coupling for reinforced pipe where the female and male threads are ground or scribed into the ends of the pipes to be joined where at least one of the scribed threads has a paced thread contact molded onto it.

In an attempt to create a coupling for non-ferrous pipe, Carter, Sr. teaches the formation of male and female coupling elements where the male element terminates in a cylindrical non-threaded, non-tapering, sealing surface adjacent its threads and the female element includes an internal sealing sleeve or liner, in U.S. Pat. No. 4,537,426. Pierpont, Jr. attempts to provide an integral joint thread on fiberglass pipe by molding threaded portions having an outer surface which is corrugated or irregular and which tapers down to the inside diameter of the pipe in U.S. Pat. No. 3,661,670. A fiberglass reinforced pipe with threaded ends is disclosed by Kimura et al. in U.S. Pat. No. 4,893,658, where metal plating is formed on the surface of at least one of the threaded ends in an effort to create a better seal. Valdes describes a synthetic plastic pipe coupling where the internally threaded fitting is made of a material harder than the material of the pipe which is coupled with the fitting, so that the threads of the fitting act as a die for creation of helical grooves on the pipe, in U.S. Pat. No. 4,488,738. In U.S. Pat. No. 5,015,014, Sweeney discloses a plastic pipe section having annular rabbets in the outer and inner peripheral surfaces thereof which are tapered substantially at a common angle so that two sections can form a male/female joint therebetween.

Unfortunately, the prior art does not adequately address the problems faced when a pipe having a standard NPT or NPTF male connection is threaded into a plastic female connection in either an adjacent pipe or the port of a fluid and/or air handling device made of plastic in order to create joint integrity without the disadvantages of over-tightening, especially where pre-applied sealants are used. Such a system is highly desired and is provided by the present invention.

DISCLOSURE OF THE INVENTION

An object of the present invention is to provide a male/female joint for a fluid handling device which creates a desirable seal between metallic male and plastic female segments. Another object of the invention is to provide a male/female joint in a fluid handling device between adjacent pipes of the handling device or between a pipe and a plastic port or fitting of the device. Yet another object of the invention is to provide a male/female joint in a fluid handling device where the joint is effective for maintaining system integrity and avoids over-tightening or other causes of restriction of fluid flow therethrough. Still another object of the present invention is to permit formation of a joint between a plastic female fitting and an industry standard male fitting.

These and other objects can be accomplished by the inventive tapered plastic joint thread system, especially for a fluid or air handling device, which requires the formation of a male/female joint between a pipe having a male fitting and either an adjacent plastic pipe or port in the device having a female fitting. The inventive system includes a pipe or port having a plastic, generally cylindrical female segment having a terminus which comprises an opening into which a male fitting can be inserted. The female segment has a first tapered segment gauged from the terminus to a controlled depth. The first tapered segment tapers from a first internal diameter to a second internal diameter. An unthreaded, non-tapering segment having the second internal diameter extends from the depth of the first tapered segment to a second controlled depth. The female segment then has an angled shoulder which tapers from the second internal diameter to a third internal diameter and which extends from the second controlled depth, that is, the depth to which the non-tapering segment extends, to a third controlled depth.

The female end segment also advantageously includes a controlled depth and diameter counterbore having a lead corner radius, and a continuously tapered lead thread within a controlled arc length of start.

The female end segment is preferably made from Engineering Grade Plastic or other suitable plastic material and is an element of a fluid handling device. The female end segment can comprise the end segment of a plastic pipe or it can be a port in the device.

The joint thread system of the present invention can also include a pipe or fitting having a standard male threaded end segment, where the inner diameter of the pipe is substantially equal to the third internal diameter of the female segment (which is the diameter needed for adequate passage of fluid to avoid restriction of fluid flow) and an outer diameter substantially equal to the second internal diameter of the female end segment. The male end segment is, in most instances, metallic, generally iron, steel, brass, copper, alloys, etc.

Moreover, sealant can be pre-applied to the male end segment without loss of integrity or creating an unreasonable risk of over-tightening of the joint.

By "plastic" is meant a high polymer, which is usually synthetic and is generally combined with other ingredients such as curatives, fillers, reinforcing agents, colorants, and plasticizers. The plastic can be formed or molded under, e.g., heat and/or pressure in its raw state and machined to a high degree of dimensional accuracy. As noted above, preferred among these are the Engineering Grade Plastics.

BRIEF DESCRIPTION OF THE DRAWINGS

The present invention will be better understood and its advantages more apparent in view of the following detailed description, especially when read with reference to the appended drawings, wherein:

FIG. 1 is a partially broken away, cross-sectional view of the female end segment of the present invention;

FIG. 2 is a partially broken away top plan view of the female end segment of FIG. 1; and FIG. 3 is a partially broken away, cross-sectional view of the male segment of the present invention.

DETAILED DESCRIPTION OF THE PREFERRED EMBODIMENT

Referring to the drawings, a tapered joint thread system in accordance with the invention is generally indicated by the reference numeral 10. It should be noted that for the sake of clarity, all the components and parts of joint thread system 10 are not shown and/or marked in all the drawings. In addition, the terms "top", "bottom", "front", "rear" and "depth" should be read with reference to the orientation of system 10 illustrated in FIG. 1. It will be understood, though, that the illustrated orientation is not necessary for operability of joint thread system 10.

Referring now to FIG. 1, joint thread system 10 generally comprises a female end segment 20. Female end segment 20 comprises one end of a plastic pipe used in a fluid handling device or, most preferably, a plastic port in a fluid handling device. Female end segment 20 can be made of Engineering Grade Plastic or other plastic material suitable for use in a fluid handling device. Female end segment 20 generally comprises a series of individual segments arranged from the egress or front 21 of female end segment 20, which generally comprises an opening sized to receive a male fitting, and extending internally into female end segment 20.

More specifically, female end segment 20 comprises a first tapered segment 22 which is gauged from egress 21 of female end segment 20 and which tapers from a first internal diameter D (which is wider than the outer diameter of the male fitting with which female end segment 20 is to be joined) to a second, smaller internal diameter D' (which is approximately equal to the tap drill diameter of the male fitting with which female end segment 20 is to be joined) and extends to a controlled depth E. The next segment of female end segment 20 comprises an unthreaded, non-tapering segment 24 having second internal diameter D', which extends from depth E to a second controlled depth E'. An angled shoulder 26 extends from non-tapering segment 24, where angled shoulder 26 tapers from second internal diameter D' to a third internal diameter D", which is narrower than second internal diameter D'. Angled shoulder 26 extends from second depth E' at which non-tapering segment 24 terminates to a third controlled depth E". Third internal diameter D", which is the narrowest internal diameter of female end segment 20, is approximately equal to the internal diameter of conduit 100 through which fluid flows.

The front end 21 of female end segment 20 can also comprise a controlled depth and diameter counterbore 28 having a lead corner radius 29 to aid in alignment of a fitting which is to be joined with female end segment 20, to avoid cross-threading at assembly. Counterbore 28 is most preferably non-tapering and extends through a tapering segment 28' to first tapered segment 22. First tapered segment 22 is provided with threads having a continuously tapered lead thread with a controlled arc length of start, allowing for an easier start of the first thread when preapplied thread sealants are used on the male fitting with which segment 20 is to be joined.

Referring now to FIG. 3, the joint thread system 10 of the present invention further comprises a pipe 100 having a male fitting 30 on an end thereof. Male fitting 30 comprises a standard NPTF tapered, threaded end segment 32 which is sized such that the outer diameter of threaded end segment 32 is narrower than first internal diameter D of first tapered segment 22 of female end segment 20 and approximately equal to second internal diameter D' of first tapered segment 22 of female end segment 20. In this way, fitting 30 will be aligned with first tapered segment 22, especially with the use of counterbore 28 and lead corner radius 29.

In use, pipe thread system 10 involves aligning threaded head 32 with female end segment 20 such that threaded head 32 is threaded into first tapered segment 22. Alignment of threaded end segment 32 with first tapered segment 22 is facilitated by counterbore 28 with lead counter corner radius 29 and lead thread 23. Even if hard, preapplied thread sealants are applied to either threaded end segment 32 or female end segment 20, tapered lead thread 23 allows for threading of threaded head 32 into first tapered segment 22. As threaded head 32 is threaded into first tapered segment 22, a tight feel is provided as a forward end 31 of threaded end segment 32 passes through controlled depth E. As threading is continued, the lead thread on threaded end segment 32 will begin to form its own thread in unthreaded, non-tapering segment 24 in the plastic material from which female end segment 20 is formed. This causes torque to increase and provides the desired tight feel to indicate threading is complete. Angled shoulder 26 then forms a solid stop to prevent gross over-tightening of threaded end segment 32 in female end segment 20. Inner diameter 34 of fitting 32 is approximately equal to third internal diameter D" of female end segment 20, which represents an adequate passage to avoid restriction of fluid flow through joint thread system 10.

Accordingly, joint thread system 10 provides several advantages over conventional tapered thread systems, which often use a square shoulder stop to reduce overtightening of fittings and do not adequately guard against overtightening or allow for proper alignment of fittings. Rather, the inventive joint thread system 10 has an angled stop which aids in sealing against the chamfered end of a tapered pipe fitting and facilitates alignment and starting of threads even with preapplied sealants. Moreover, the inventive system permits use of industry standard male fittings, joined with plastic female fittings.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention, which is defined by the following claims.

We claim:

1. A tapered joint thread system capable of providing a high integrity seal comprising a tapered threaded metallic male fitting having an internal diameter and an external diameter and a plastic female end segment having an opening sized to receive said threaded metallic male fitting, wherein said plastic female end segment comprises a first threaded segment which tapers to an internal diameter which is approximately equal to the smallest external diameter of said threaded male fitting; said female end segment further comprising an unthreaded non-tapering segment into which said threaded metallic male fitting will begin to form its own thread when said threaded metallic male fitting is threaded into said plastic female end segment, and an angled shoulder which tapers from said internal diameter to a second internal diameter which is approximately equal to the internal diameter of said threaded male fitting.

2. The tapered joint thread system of claim 1, wherein said female end segment further comprises a controlled depth and diameter counterbore having a lead corner radius.

3. The tapered joint thread system of claim 2, wherein said female end segment further comprises a continuously tapered lead thread with a controlled arc length of start.

4. The tapered joint thread system of claim 3, wherein said second internal diameter of said female end segment and said internal diameter of said threaded male fitting comprises the diameter needed for adequate fluid passage to avoid restriction of fluid flow.

5. The tapered joint thread system of claim 1, wherein said female end segment is formed of Engineering Grade Plastic.

6. The tapered joint thread system of claim 5, wherein each of said threaded male fitting and said female end segment are elements of a fluid handling system.

7. A fluid handling device comprising a pipe or fitting capable of providing a high integrity seal having a tapered threaded metallic male fitting which has an internal diameter and an external diameter, and a port having a plastic female end segment which has opening sized to receive said threaded metallic male fitting, wherein said plastic female end segment comprises a threaded first segment which tapers from a first internal diameter to a second internal diameter which is approximately equal to the smallest external diameter of said threaded male fitting; said female end segment further comprising an unthreaded non-tapering segment into which said threaded metallic male fitting will begin to form its own thread when said threaded metallic male fitting is threaded into said plastic female end segment, and an angled shoulder which tapers from said second internal diameter to a third internal diameter which is approximately equal to the internal diameter of said threaded male fitting.

8. The fluid handling device of claim 7, wherein said female end segment further comprises a controlled depth and diameter counterbore having a lead corner radius.

9. The fluid handling device of claim 8, wherein said female end segment further comprises a continuously tapered lead thread with a controlled arc length of start.

10. The fluid handling device of claim 9, wherein said second internal diameter of said female end segment and said internal diameter of said threaded male fitting comprises the diameter needed for adequate fluid passage to avoid restriction of fluid flow.

11. The fluid handling device of claim 7, wherein said female end segment is formed of Engineering Grade Plastic.

* * * * *